United States Patent
Carns et al.

(10) Patent No.: US 9,360,144 B2
(45) Date of Patent: Jun. 7, 2016

(54) CONDUIT WITH JOINT COVERED BY A BOOT

(75) Inventors: James A. Carns, Wichita, KS (US);
Theron L. Cutler, Wichita, KS (US);
Mark A. Shelly, Bel Aire, KS (US)

(73) Assignee: THE BOEING COMPANY, Chicago, IL (US)

( * ) Notice: Subject to any disclaimer, the term of this patent is extended or adjusted under 35 U.S.C. 154(b) by 1538 days.

(21) Appl. No.: 11/876,043

(22) Filed: Oct. 22, 2007

(65) Prior Publication Data

US 2009/0102187 A1    Apr. 23, 2009

(51) Int. Cl.
*F16L 27/04*    (2006.01)
*F16L 39/00*    (2006.01)
*F16L 25/01*    (2006.01)
*B64D 37/00*    (2006.01)
*B64D 37/32*    (2006.01)

(52) U.S. Cl.
CPC ............. *F16L 39/005* (2013.01); *F16L 25/01* (2013.01); *B64D 37/005* (2013.01); *B64D 37/32* (2013.01); *F16L 2201/30* (2013.01)

(58) Field of Classification Search
CPC ...... F16L 39/005; F16L 25/01; F16L 2201/30
USPC ............. 285/50, 121.1, 212.2, 121.6, 123.1, 285/123.3, 123.4, 123.5, 123.6, 123.9, 285/123.12, 123.13, 123.16, 123.17, 124.2, 285/124.3, 226, 227, 228, 397, 398, 417, 285/121.2, 124.4; 138/111, 112, 113, 114
See application file for complete search history.

(56) References Cited

U.S. PATENT DOCUMENTS

| 279,087 | A |   | 5/1883 | Emery |
| 1,466,592 | A |   | 8/1923 | King |
| 1,497,652 | A |   | 6/1924 | Browne |
| 2,491,599 | A |   | 12/1949 | Allen |
| 3,427,051 | A | * | 2/1969 | White et al. ............... 285/145.5 |
| 3,472,062 | A | * | 10/1969 | Owen ........................ 73/40.5 R |
| 3,485,516 | A |   | 12/1969 | Hans et al. |
| 3,669,474 | A |   | 6/1972 | Bode |
| 3,830,290 | A |   | 8/1974 | Thamasett et al. |

(Continued)

FOREIGN PATENT DOCUMENTS

| DE | 9111431 | 5/1992 |
| WO | 9403752 A | 2/1994 |
| WO | 2007057629 A | 5/2007 |

OTHER PUBLICATIONS

Webpage entitled "Universal Bellows", DME Incorporated, dated May 5, 2004, accessed on the World Wide Web on Nov. 18, 2010, site "http://web.archive.org/web/20040505084913/http://www.dmeexpansionjoints.com/universal-bellows.htm".*

(Continued)

*Primary Examiner* — Daniel P Stodola
*Assistant Examiner* — Jay R Ripley
(74) *Attorney, Agent, or Firm* — Yee & Associates, P.C.

(57) ABSTRACT

An exemplary embodiment provides a shrouded conduit joint assembly that includes a joint assembly and a boot shroud. The joint assembly includes a first ferrule having a first seal, and a second ferrule having a second seal. A clamp operatively engages the first ferrule and the second ferrule. The boot shroud surrounds the joint assembly and is spaced from the joint assembly to create a leak detection space between the joint assembly and the boot shroud.

8 Claims, 7 Drawing Sheets

(56) References Cited

U.S. PATENT DOCUMENTS

| | | | | |
|---|---|---|---|---|
| 3,837,685 | A | * | 9/1974 | Miller .................... 285/45 |
| 3,842,187 | A | * | 10/1974 | Barkan .................... 174/38 |
| 3,954,288 | A | | 5/1976 | Smith |
| 4,157,194 | A | | 6/1979 | Takahashi |
| 4,285,239 | A | * | 8/1981 | Heine et al. .................... 73/434 |
| 4,429,905 | A | | 2/1984 | Valentine |
| 4,455,040 | A | | 6/1984 | Shinn |
| 4,461,399 | A | * | 7/1984 | Sattelberg et al. .................... 220/565 |
| 4,569,540 | A | | 2/1986 | Beson |
| 4,881,760 | A | | 11/1989 | Runkles et al. |
| 4,900,070 | A | * | 2/1990 | Runkles et al. .................... 285/233 |
| 5,015,515 | A | * | 5/1991 | Paulin .................... 428/36.8 |
| 5,054,523 | A | * | 10/1991 | Rink .................... 137/377 |
| 5,090,871 | A | | 2/1992 | Story et al. |
| 5,188,400 | A | | 2/1993 | Riley et al. |
| 5,312,137 | A | | 5/1994 | Nee |
| 5,330,720 | A | * | 7/1994 | Sorbo et al. .................... 422/98 |
| 5,419,593 | A | * | 5/1995 | Greene et al. .................... 285/123.1 |
| 5,427,474 | A | | 6/1995 | Silvers |
| 5,533,760 | A | * | 7/1996 | Welch .................... 285/14 |
| 5,620,210 | A | | 4/1997 | Eyster et al. |
| 5,749,607 | A | | 5/1998 | Carr |
| 6,041,645 | A | * | 3/2000 | Lawson et al. .................... 73/46 |
| 6,299,216 | B1 | | 10/2001 | Thompson |
| 6,446,661 | B2 | * | 9/2002 | Armenia et al. .................... 137/312 |
| 6,848,720 | B2 | | 2/2005 | Carns et al. |
| 6,971,682 | B2 | | 12/2005 | Hoang et al. |
| 7,213,787 | B2 | | 5/2007 | Carns et al. |
| 7,226,089 | B2 | | 6/2007 | Wilkinson |
| 7,293,741 | B2 | | 11/2007 | Carns et al. |
| 7,437,952 | B2 | | 10/2008 | Carns et al. |
| 7,493,911 | B2 | | 2/2009 | Carns et al. |
| 7,533,850 | B2 | | 5/2009 | Carns et al. |
| 2004/0026922 | A1 | | 2/2004 | Carns et al. |
| 2004/0207197 | A1 | | 10/2004 | Hoang et al. |
| 2005/0120534 | A1 | | 6/2005 | Carns et al. |
| 2006/0027860 | A1 | | 2/2006 | Nomoto |
| 2006/0278017 | A1 | | 12/2006 | Carns et al. |
| 2006/0278759 | A1 | | 12/2006 | Carns et al. |
| 2006/0278761 | A1 | | 12/2006 | Cutler et al. |
| 2006/0278763 | A1 | | 12/2006 | Carns et al. |
| 2007/0102583 | A1 | | 5/2007 | Cutler et al. |
| 2008/0264951 | A1 | | 10/2008 | Tweet et al. |
| 2009/0091126 | A1 | | 4/2009 | Carns et al. |
| 2009/0127848 | A1 | | 5/2009 | Carns et al. |

OTHER PUBLICATIONS

Webpage entitled "Expansion Joint Accessories", DME Incorporated, dated Apr. 29, 2004, accessed on the World Wide Web on Nov. 18, 2010, site "http://web.archive.org/web/20040429102447/http://www.dmeexpansionjoints.com/expansion-accessories.htm".*
USPTO Office Action for U.S. Appl. No. 11/943,460 dated Dec. 9, 2009.
U.S. Appl. No. 11/768,539, filed Jun. 26, 2007, Carns et al.
U.S. Appl. No. 12/419,970, filed Apr. 7, 2009, Carns et al.
EP Search Report dated Sep. 7, 2009 for application 08166655.4, pp. 1-8.
USPTO office action for U.S. Appl. No. 11/867,557 dated Oct. 5, 2009.
DME Incorporated, Terms and Definitions, 2004, retrieved Feb. 13, 2011, pp. 1-2. www.dmeexpansionjoints.com/terms-definitions.htm.
EPO Search Report for application EP08165951 dated Apr. 28, 2011, received Jun. 16, 2011.
USPTO Notice of Allowance for U.S. Appl. No. 11/943,460 dated Dec. 28, 2010.

* cited by examiner

CONDUIT WITH JOINT COVERED BY A BOOT

TECHNICAL FIELD

The embodiments described herein generally relate to conduits carrying a fluid, and more particularly relate to coupling assemblies for coupling together conduits for transfer of fluids.

BACKGROUND

It is sometimes necessary to couple together fuel conduits to transfer fuel from a source to a receiving vessel. The Federal Aviation Administration (FAA) has promulgated regulations regarding the safe transfer of fuel via conduits in the aerospace industry. In order to meet some of these regulations, fuel transfer conduits may be structured as a "tube within a tube," often referred to as a "shrouded conduit," which effectively provides a double-walled conduit for containment of the fuel. In use, the fuel flows in the inner tube, or primary fuel conduit, and the annular space between the inner and outer conduits provides a leak detection zone.

Leak detection at a junction between two conduits is often important, especially when the fluid in the conduits is combustible, highly valuable, or a toxic or hazardous substance. Accordingly, technologies for leak prevention and detection of leaks at a junction between two conduits are important in certain industries and in certain fluid transfer operations.

BRIEF SUMMARY

An exemplary embodiment provides a shrouded conduit joint assembly that includes a joint assembly and a boot shroud. The joint assembly includes a first ferrule having a first seal, and a second ferrule having a second seal. A clamp operatively engages the first ferrule and the second ferrule. The boot shroud surrounds the joint assembly and is spaced from the joint assembly to create a leak detection space between the joint assembly and the boot shroud.

Another exemplary embodiment provides a shrouded conduit joint assembly that includes a joint assembly and a boot shroud. The joint assembly has a first ferrule having a circumferential groove comprising a first o-ring seal, a second ferrule having a circumferential groove comprising second o-ring seal, and a clamp operatively engaging the first ferrule and the second ferrule. The boot shroud surrounds the joint assembly and is spaced from the joint assembly to create a leak detection space between the joint assembly and the boot shroud.

A yet further exemplary embodiment provides a shrouded conduit joint assembly that includes a joint assembly and a boot shroud. The joint assembly has a first ferrule having a circumferential groove comprising a first o-ring seal, and a second ferrule having a circumferential groove comprising second o-ring seal. A seal ring surrounds the first o-ring seal and the second o-ring seal, and a clamp surrounds the seal ring. The clamp operatively engages the first ferrule and the second ferrule to couple the first ferrule to the second ferrule. The boot shroud is flexible and surrounds the joint assembly and is spaced from the joint assembly to create a leak detection space between the joint assembly and the boot shroud.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
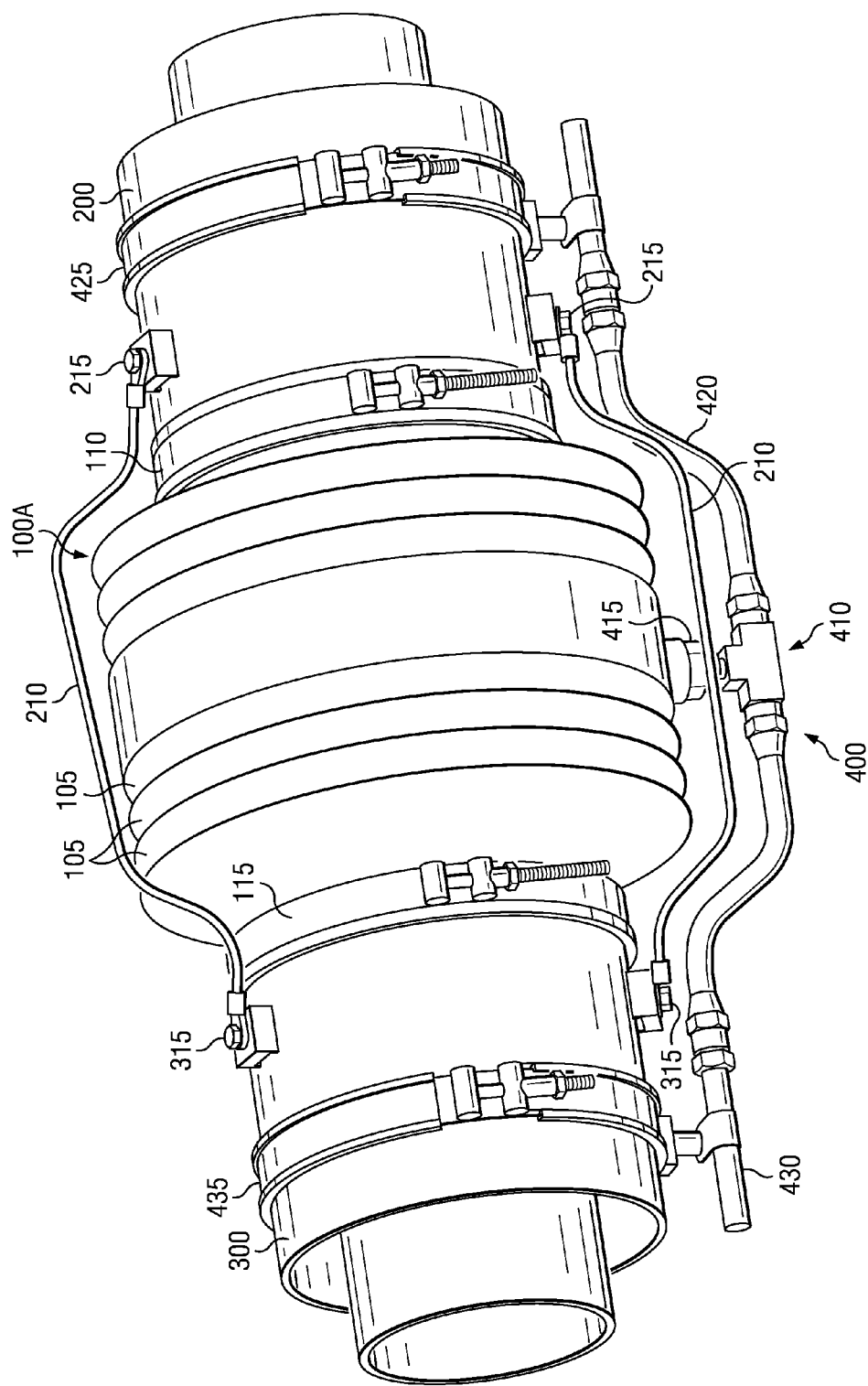
FIG. 1 is a perspective view of an exemplary embodiment of a boot shroud at a conduit joint assembly also depicting ancillary equipment.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Any specific references to aircraft herein should not be construed as limiting the scope of the present embodiments. In addition, it is also anticipated that the embodiments will be applicable to any of a wide range of fluids, e.g., gases and liquids, regardless of whether the fluid is being used as a fuel. Accordingly, specific references to fuel, gases, or liquids herein should not be construed as limiting the scope of the embodiments.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Figure 2:
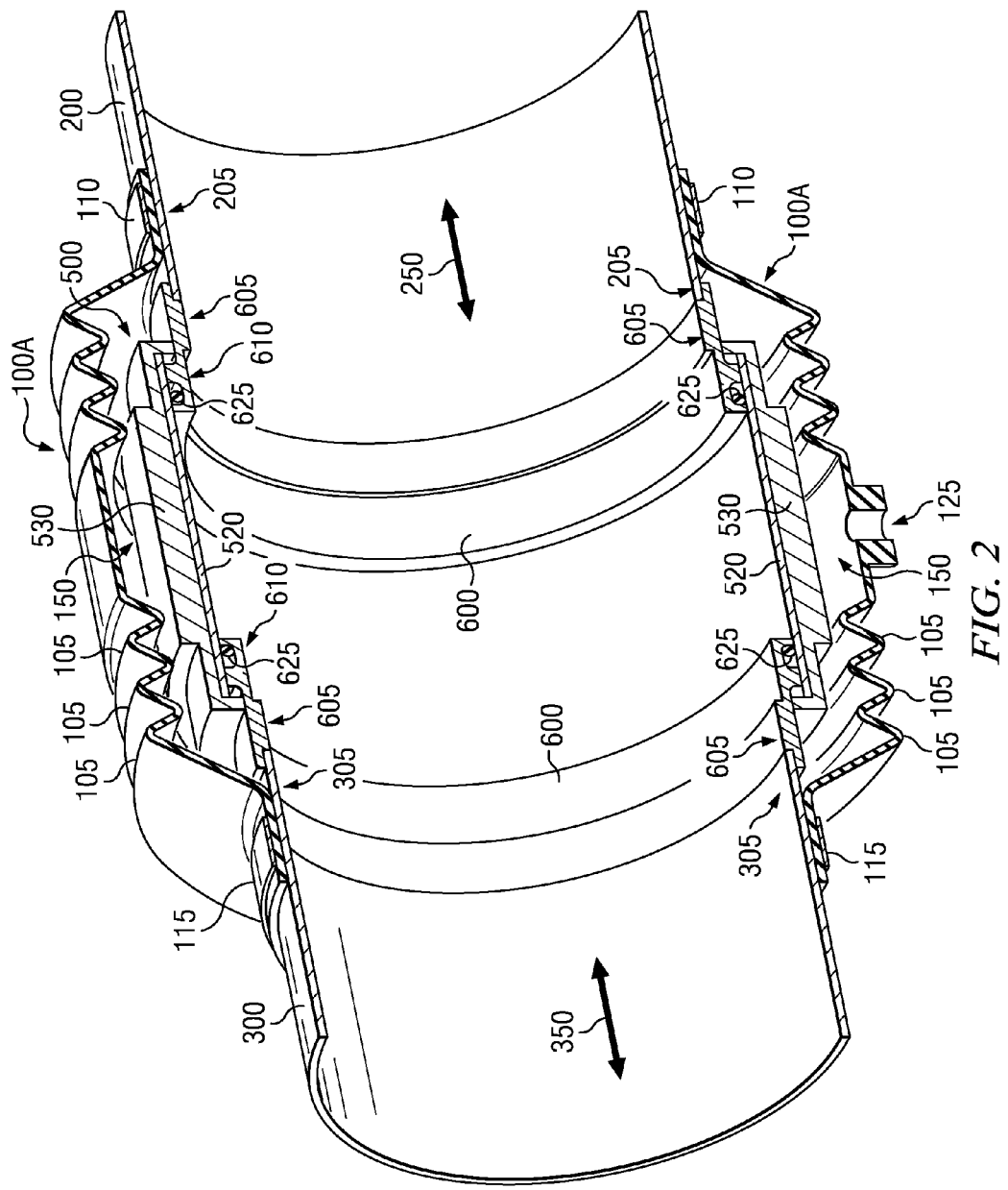
FIG. 2 is a cross sectional view of the exemplary embodiment of FIG. 1.

FIGS. 1 and 2 illustrate an exemplary embodiment of a boot shroud 100A surrounding a conduit joint assembly 500. This particular embodiment is intended for use with conduits under "high" internal pressure, where "high" means above about 500 psi, for example, but may of course be used at lower pressures, if desired and appropriate. In general, boot shrouds may be fabricated of any of a variety of suitable materials depending upon surrounding environment conditions, temperature and pressure of the fluid in the conduits, nature of the fluid (corrosive, toxic, etc.) and other engineering considerations. In many instances, the boot shroud may be fabricated of a suitable metal, or plastic material (polymer or polymer-composite). The boot shroud 100A may be flexible with corrugations 105 to facilitate flexing. The illustrated embodiment of a boot shroud 100A has a bellows-like structure well adapted to flexing by compression and/or expansion of the bellows-like corrugations or folds 105.

Referring to FIG. 1, the boot shroud 100A extends between a first conduit 200 with a lumen 250 and a second conduit 300 with a lumen 350. One or both conduits may be flexible. Boot shroud 100A is secured to first conduit 200 by a first circular clamp 110 and is secured to second conduit 300 by a second circular clamp 115.

Referring more particularly to FIG. 2, boot shroud 100A surrounds the conduit joint assembly 500 to form a leak detection space 150 between the boot shroud 100A and the conduit joint assembly 500. Boot shroud 100A has a through-hole 125, in this embodiment, for receiving sensors or for providing a drainage point for any leaks from the conduit joint assembly 500 that enter the leak detection space 150.

The conduit joint assembly is symmetrical in this embodiment and a pair of ferrule adapters 600, one attached to the end 205 of first conduit 200 and another attached to the end 305 of second conduit 300. Ferrule adapter 600 is of substantially cylindrical shape with one end 605 configured to engage and end of a conduit, and another end 610 having a circumferentially extending groove 626 to receive an o-ring seal 625. Thus, ferrule adapters 600 each present an o-ring bearing end to the other for joining together. A seal ring 520 covers the adjacent o-ring seals 625 and the seal ring 520 is surrounded by and secured in position by a circular clamp 530. While the circular clamp may not directly touch the o-ring seals 625, the circular clamp is nevertheless considered to operatively engage and secure the o-ring seals to form the conduit joint assembly 500.

FIG. 1 also depicts ancillary equipment not shown in FIG. 2, for simplicity. For example, a pair of electrical conductors 210 extends from a connection point 215 on the first conduit 200 to a connection point 315 on the second conduit 300. The electrical connectors ensure that any electrical potential between the first conduit and the second conduit is minimized and reduces the risk of electrical arcing. In addition, a joint drainage system 400 includes a three-way connector 410 having a first leg 415 in communication with an internal leak detection space 150 of the boot shroud 100A via through-hole 125 to collect any leaked fluid. Any leaked fluid may then be transported away via conduits 420, 430 for analysis, disposal or other purposes. Conduit 420 is secured to first conduit 200 by a circular clamp 425 and conduit 430 is secured to second conduit 300 by circular clamp 435.

Figure 3:
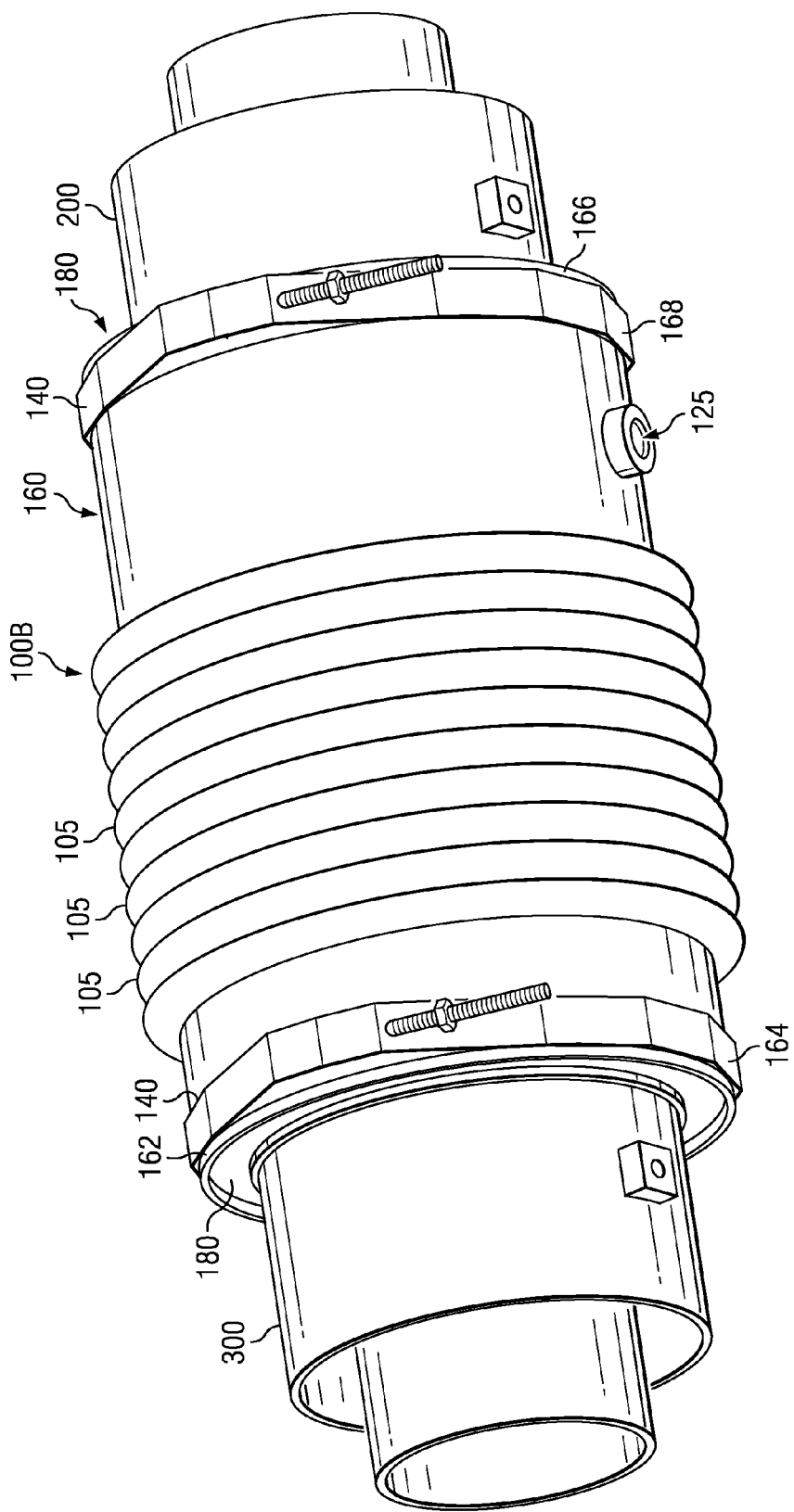
FIG. 3 is a perspective view of another exemplary embodiment of a boot shroud at a conduit joint assembly.
Figure 4:
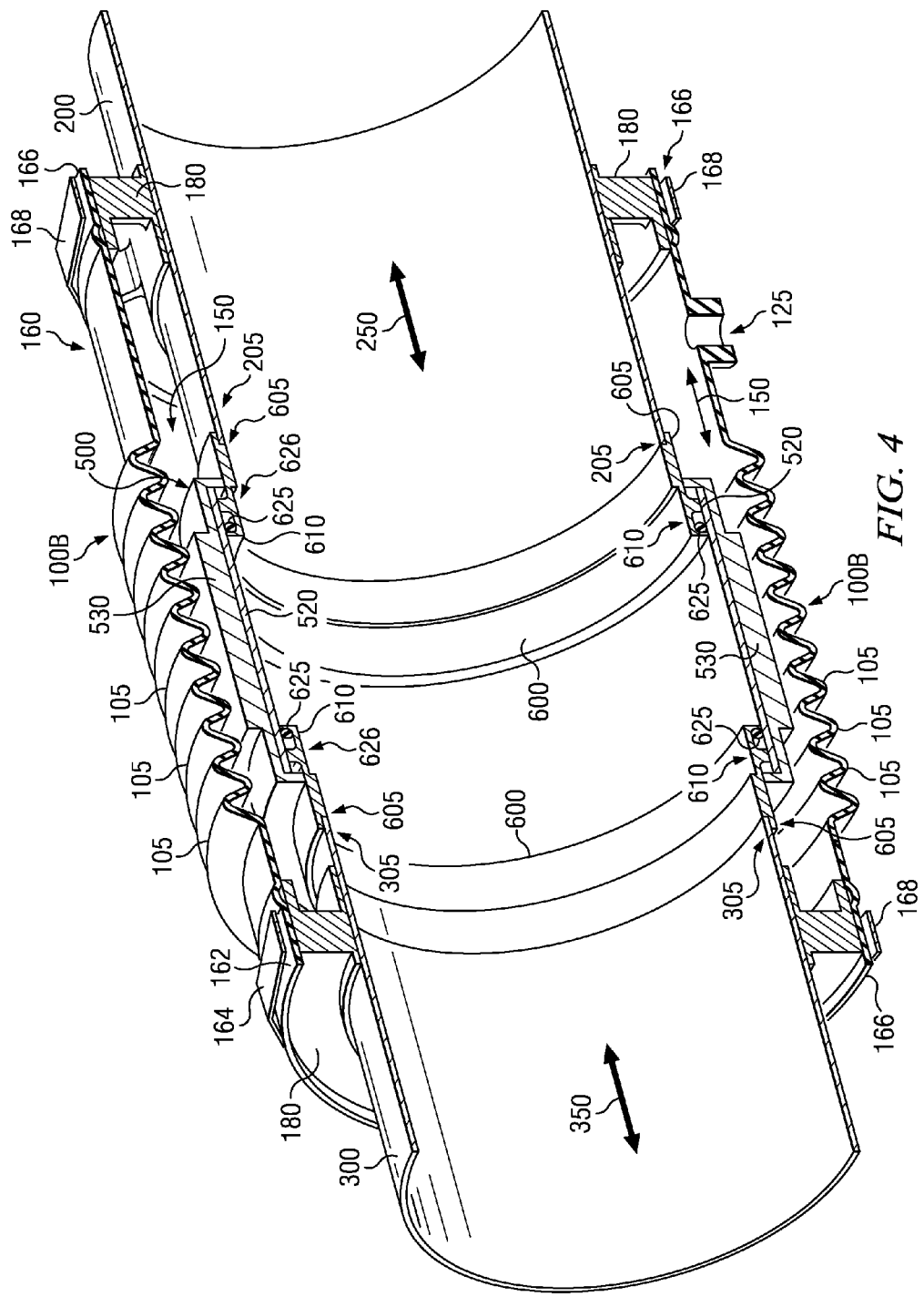
FIG. 4 is a cross sectional view of the exemplary embodiment of FIG. 3.

FIGS. 3 and 4 depict another embodiment of a boot-shrouded conduit joint 500. In this instance, the boot shroud 100B is configured and adapted for high pressure service. The boot shroud 100B has corrugations 105 on one portion of its surface and an extended, smooth corrugation-free area 160. The boot shroud is clamped to the first conduit 200 and to the second conduit 300 proximate its shroud ends 162, 166. Shroud end 162 surrounds a shroud-securing ring 180 that surrounds and is affixed to the second conduit 300. A circular clamp 164 surrounds the shroud end 162 and clamps it to the shroud-securing ring 180. Likewise, shroud end 166 is secured by clamp 168 and a shroud-securing ring 180. Thus affixed to the conduits 200, 300, the boot shroud surrounds the conduit joint assembly 500 and provides a leak detection space 150 between the boot shroud 100B and the conduit joint assembly 500. The leak detection space 150 may have a through-hole 125, as shown, to permit drainage of any leaked fluid and/or insertion of instruments, for example, via a three-way connector 410 (shown in FIG. 4 only).

The conduit joint assembly 500 is symmetrical in this embodiment as well, and a pair of ferrule adapters 600, one attached to the end 205 of first conduit 200 and another attached to the end 305 of second conduit 300. Ferrule adapter 600 is of substantially cylindrical shape with one end 605 configured to engage and end of a conduit, and another end 610 having a groove to receive an o-ring seal 625. Thus, ferrule adapters 600 each present an o-ring-bearing end 610 to the other for joining together. A seal ring 520 covers the adjacent o-ring seals 625 and the seal ring 520 is surrounded by and secured in position by a circular clamp 530. While the circular clamp may not directly touch the o-ring seals 625, the circular clamp is nevertheless considered to operatively engage and secure the o-ring seals to form the conduit joint assembly 500.

Yet other exemplary embodiments provide shrouded couplings for shrouded or "double-walled" conduits. Such conduits are described for example in commonly assigned U.S. Ser. No. 10/988,309 filed Nov. 13, 2004, which is hereby incorporated by reference.

Figure 6:
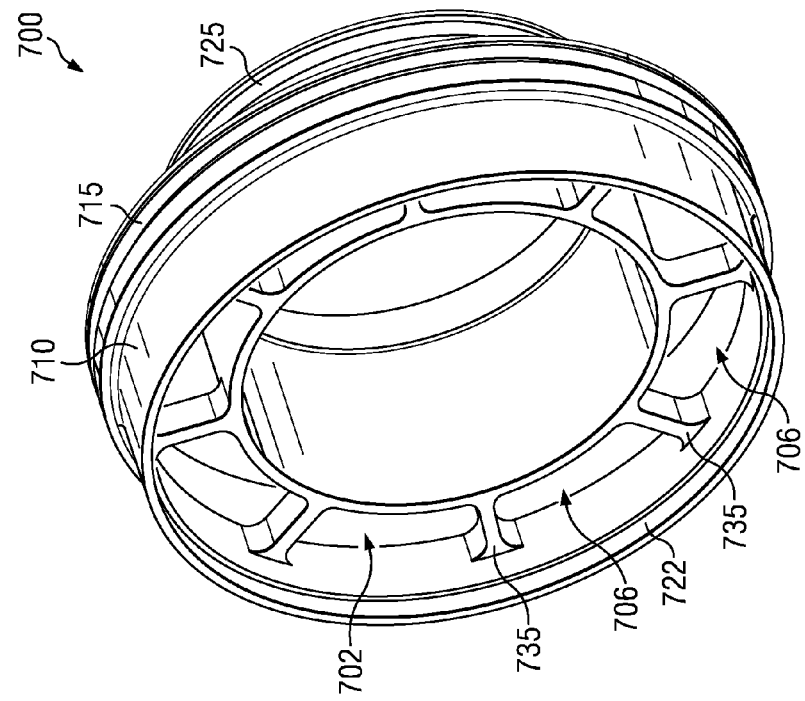
FIGS. 5 and 6 are perspective views of an embodiment of a ferrule end adapter for use with double-walled conduits.
Figure 5:
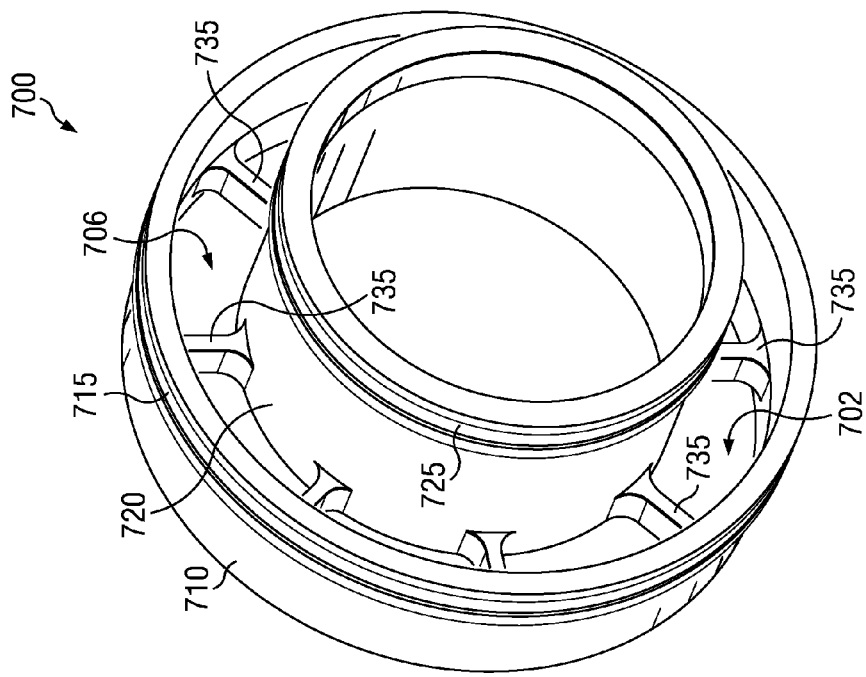

A ferrule adapter is required to couple together two shrouded conduits. An exemplary embodiment of a ferrule adapter 700 is shown in FIGS. 5 and 6. The ferrule adapter 700 is of substantially cylindrical overall shape and includes an inner cylinder 720 nested within an outer cylinder 710. Inner cylinder 720 and outer cylinder 710 are coaxial with an annular space 702 between them. The inner cylinder 720 is spaced from the outer cylinder 710 by a series of spokes 735 arrayed such that fluid may flow in spaces between the series of spokes 735. The inner cylinder 720 has a groove around its outer circumference, proximate its extremity, configured to receive an o-ring seal 725. The outer cylinder 710 likewise has a groove around its circumference, proximate its extremity, configured to receive an o-ring seal 715. The inner cylinder 720 also has an opposite extremity 722 adapted to receive an end of a conduit. Likewise, the outer cylinder 710 has an opposite extremity 712 adapted to receive an end of a conduit.

Figure 7:
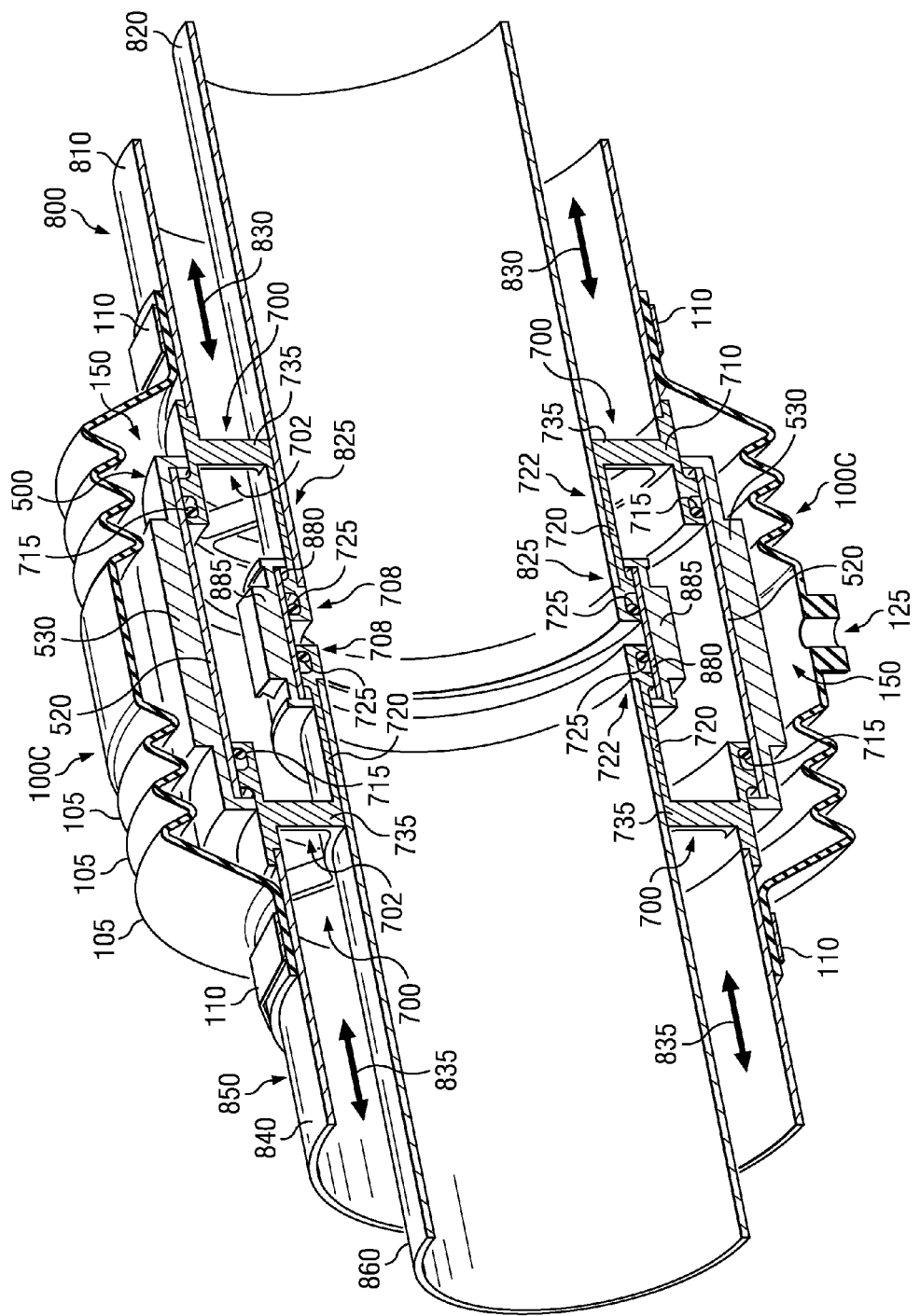
FIG. 7 is a is a cross sectional view of an exemplary embodiment of a boot shroud at a joint assembly of a double-walled conduit.

Referring to FIG. 7, a first shrouded conduit 800 is coupled to a second shrouded conduit 850 utilizing a pair of ferrule adapters 700. First shrouded conduit 800 includes a first inner passageway 820 surrounded by a first outer passageway 810 with an annular space 830 between the two passageways. Likewise, second shrouded conduit 850 includes a second inner passageway 860 surrounded by a second outer passageway 840 with an annular space 835 between them. The annular spaces 830, 835 may serve as leak detection spaces. Accordingly, it is desirable to isolate these annular spaces 830, 835 from communication with interiors of the inner passageways 820, 860, and to maintain a leak detection space when coupling together the two shrouded conduits 800, 850.

As illustrated in FIG. 7, a boot shroud 100C covers the conduit joint assembly 500 with a leak detection space 150 between the boot shroud 100 and the conduit joint assembly 500. Further, the leak detection space 150 is in fluid communication with annular spaces 830, 835 through spaces 706 between the series of spokes 735 of each of the two ferrule adapters 700. Accordingly, leak detection is not compromised. In addition, a boot shroud 100C has a through-hole 125 for removal of leaking material, for venting, and/or for insertion of probes or other instruments.

In the illustrated exemplary embodiment, the conduit joint assembly 500 requires coupling together outer cylinder 710 and inner cylinder 720 of one ferrule adapter 700 to its counterpart on the other ferrule adapter 700. This is achieved by bringing the outer extremities 708 of the inner cylinders 720 of each ferrule adapter 700 into contact, and enclosing opposed o-ring seals 725 within a surrounding inner seal ring 880, which is in turn secured with an inner circular clamp 885. Likewise, o-ring seals 725 of the outer cylinders 720 are enclosed within a surrounding outer seal ring 520 that is secured by a circular clamp 530. This securing of the o-ring seals effectively forms the conduit joint assembly 500. A boot shroud 100 surrounds the conduit joint assembly 500, with a leak detection space between them, as explained above. The shroud in this example is sealed to the shrouded conduits 800, 850 with a pair of circular clamps 110 that seal outer ends of the boot shroud 100 to the outer surface of the outer passageways 810, 840, as illustrated.

Figure 8:
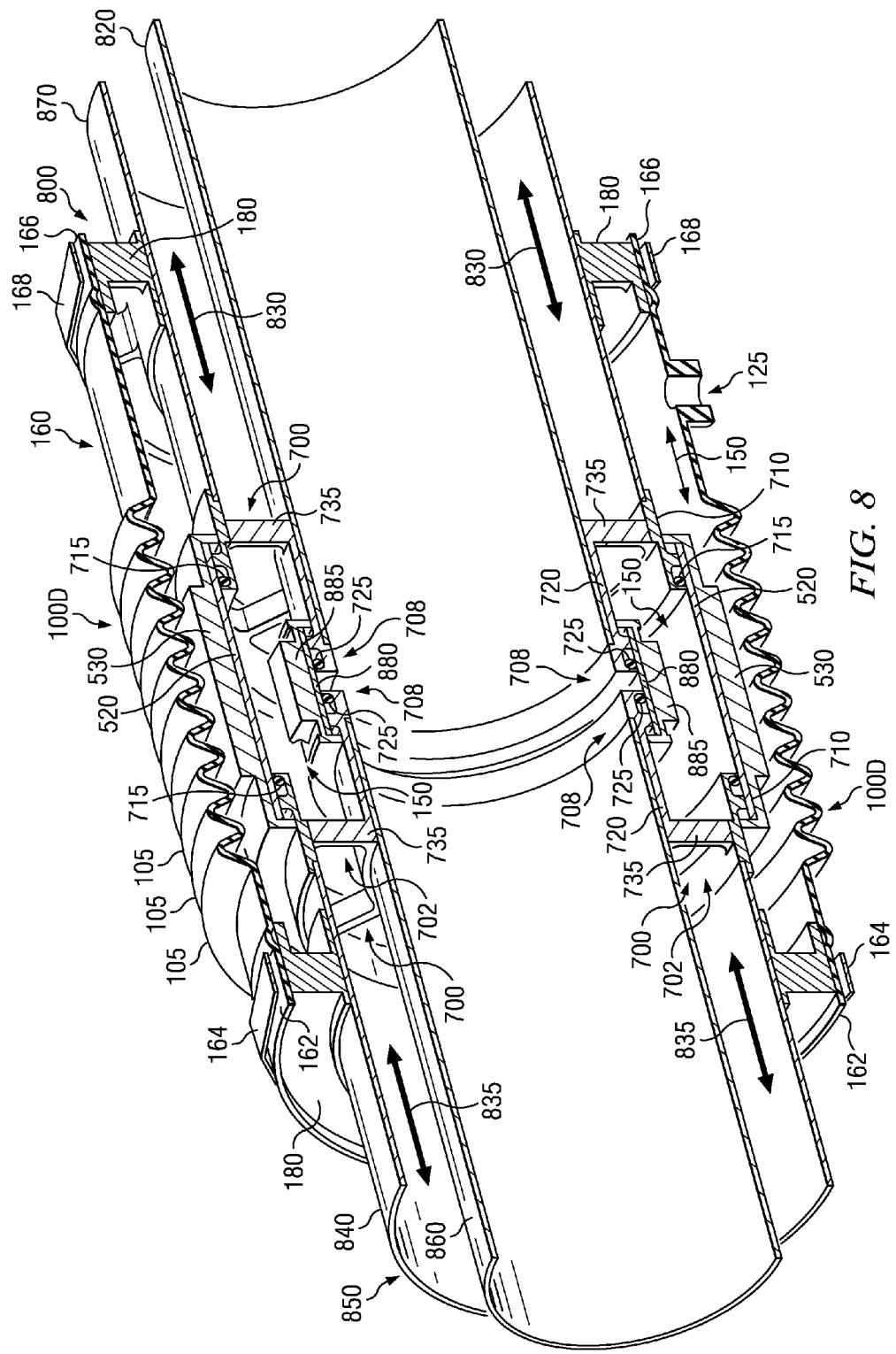
FIG. 8 is a is a cross sectional view of another exemplary embodiment of a boot shroud at a joint assembly of a double-walled conduit.

In an alternative embodiment, shown in FIG. 8, the primary distinction is the technology for sealing the boot shroud 100 to the outer surfaces of the passageways 810, 840. The boot shroud 100D is longer, having a smooth corrugation-free area 160 that is free of corrugations 105. In addition, a shroud-securing ring 180 is sealed to the outer passageways 810, 840 and presents an upper surface onto which shroud ends 162, 166 of the boot shroud 100D are clamped by circular clamps 164 and 168 respectively, to form a secure seal. The conduit joint assembly 500 is assembled as described for FIG. 7, above. Outer cylinder 710 and inner cylinder 720 of one ferrule adapter 700 are coupled to their respective counterparts on the other ferrule adapter 700. This is achieved by bringing the outer extremities 708 of the inner cylinders 720 of each ferrule adapter 700 into contact, and enclosing opposed o-ring seals 725 within a surrounding inner seal ring 880, which is in turn secured with an inner circular clamp 885. Likewise, o-ring seals 725 of the outer cylinders 720 are enclosed within a surrounding outer seal ring 520 that is secured by a circular clamp 530. This securing of the o-ring seals effectively forms the conduit joint assembly 500. A boot shroud 100D surrounds the conduit joint assembly 500, with a leak detection space between them, as explained above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A shrouded conduit joint assembly comprising:
    a joint assembly connecting a first dual conduit pipe and a second dual conduit pipe, the joint assembly comprising:
        a first end adapter having a first circumferential groove comprising a first o-ring seal and a third circumferential groove comprising a third o-ring seal;
        a second end adapter having a second circumferential groove comprising a second o-ring seal and a fourth circumferential groove comprising a fourth o-ring seal; and
        a first clamp operatively engaging the first end adapter and the second end adapter;
    a second clamp operatively engaging the third o-ring seal and the fourth o-ring seal; and
    a boot shroud surrounding the joint assembly and creating a leak detection space between the joint assembly and the boot shroud;
    wherein the boot shroud comprises a first area, a second area, and a third area;
    wherein the first area comprises a first corrugation-free cylindrical surface and a first set of cylindrical corrugations, the second area comprises a second corrugation-free cylindrical surface, and the third area comprises a second set of cylindrical corrugations and a third corrugation-free cylindrical surface;
    wherein the second area is between the first area and the third area;
    wherein the boot shroud is sealed to a first outer surface of the first dual conduit pipe at the first corrugation-free cylindrical surface and to a second outer surface of the second dual conduit pipe at the third corrugation-free cylindrical surface;
    a cylindrical projection extending from the second corrugation-free surface;
    a through hole extending through the second area and through a center of the cylindrical projection;
    wherein each corrugation of the first set of cylindrical corrugations has a first outermost diameter and each corrugation of the second set of cylindrical corrugations has a second outermost diameter;
    wherein the second corrugation-free cylindrical surface has a diameter approximately equal to the first outermost diameter and to the second outermost diameter.

2. The shrouded conduit joint assembly of claim 1, wherein the first end adapter comprises a first cylindrical portion having the o-ring seal proximate an end of the first cylindrical portion, and the second end adapter comprises a second cylindrical portion having the o-ring seal proximate an end of the second cylindrical portion.

3. The shrouded conduit joint assembly of claim 1, wherein the first end adapter and the second end adapter each comprise an inner cylindrical portion and an outer cylindrical portion, the inner cylindrical portion spaced from the outer cylindrical portion by a series of spokes with spaces between the series of spokes for fluid communication through the spaces.

4. The shrouded conduit joint assembly of claim 1, wherein the boot shroud is flexible.

5. The shrouded conduit joint assembly of claim 1 further comprising:
    wherein each corrugation of the first set of cylindrical corrugations has a first innermost diameter and each corrugation of the second set of cylindrical corrugations has a second innermost diameter;
    wherein the first corrugation-free cylindrical surface is adjoiningly connected to the first set of cylindrical corrugations by a first portion of one of the first set of cylindrical corrugations that extends radially inward beyond the first innermost diameter to the first cylindrical surface;
    wherein the second corrugation-free cylindrical surface is adjoiningly connected to the second set of cylindrical corrugations by a second portion of one of the second set of cylindrical corrugations that extends radially inward beyond the second innermost diameter to the second cylindrical surface.

6. A shrouded conduit joint assembly comprising:
    a flexible joint assembly connecting a first dual conduit pipe and a second dual conduit pipe, the flexible joint assembly comprising:
        a first end adapter having a first circumferential groove comprising a first o-ring seal and a third circumferential groove comprising a third o-ring seal;
        a second end adapter having a second circumferential groove comprising a second o-ring seal and a fourth circumferential groove comprising a fourth o-ring seal;
        a first seal ring surrounding the first o-ring seal and the second o-ring seal;

a second seal ring surrounding the third o-ring seal and the fourth o-ring seal; and a first clamp surrounding the first seal ring and a second clamp surrounding the second seal ring, wherein the first clamp and the second clamp operatively engage the first end adapter and the second end adapter to couple the first end adapter to the second end adapter; and a flexible boot shroud surrounding the flexible joint assembly and creating a leak detection space between the flexible joint assembly and the flexible boot shroud;

wherein the boot shroud comprises a first area, a second area, and a third area;

wherein the first area comprises a first corrugation-free cylindrical surface and a first set of cylindrical corrugations, the second area comprises a second corrugation-free cylindrical surface, and the third area comprises a second set of cylindrical corrugations and a third corrugation-free cylindrical surface;

wherein the second area is between the first area and the third area;

wherein the boot shroud is sealed to a first outer surface of the first dual conduit pipe at the first corrugation-free cylindrical surface and to a second outer surface of the second dual conduit pipe at the third corrugation-free cylindrical surface;

a cylindrical projection extending from the second corrugation-free surface;

a through hole extending through the second area and through a center of the cylindrical projection;

wherein each corrugation of the first set of cylindrical corrugations has a first outermost diameter and each corrugation of the second set of cylindrical corrugations has a second outermost diameter;

wherein the second corrugation-free cylindrical surface has a diameter approximately equal to the first outermost diameter and to the second outermost diameter;

wherein each corrugation of the first set of cylindrical corrugations has a first innermost diameter and each corrugation of the second set of cylindrical corrugations has a second innermost diameter;

wherein the first corrugation-free cylindrical surface is adjoiningly connected to the first set of cylindrical corrugations by a first portion of one of the first set of cylindrical corrugations that extends radially inward beyond the first innermost diameter to the first cylindrical surface;

wherein the second corrugation-free cylindrical surface is adjoiningly connected to the second set of cylindrical corrugations by a second portion of one of the second set of cylindrical corrugations that extends radially inward beyond the second innermost diameter to the second cylindrical surface.

7. The shrouded conduit joint assembly of claim 6, wherein the first end adapter comprises a first cylindrical portion having the first o-ring seal proximate an end of the first cylindrical portion, and the second end adapter comprises a second cylindrical portion having the third o-ring seal proximate an end of the second cylindrical portion.

8. The shrouded conduit joint assembly of claim 6, wherein the first end adapter and the second end adapter each comprise an inner cylindrical portion and an outer cylindrical portion, the inner cylindrical portion spaced from the outer cylindrical portion by a series of spokes with spaces between the series of spokes for fluid communication through the spaces.

* * * * *